United States Patent [19]
Dejneka et al.

[11] Patent Number: 5,952,253
[45] Date of Patent: Sep. 14, 1999

[54] TRANSPARENT APATITE GLASS CERAMICS

[75] Inventors: Matthew John Dejneka; Linda Ruth Pinckney, both of Corning, N.Y.

[73] Assignee: Corning Incorporated, Corning, N.Y.

[21] Appl. No.: 09/054,668

[22] Filed: Apr. 3, 1998

Related U.S. Application Data

[60] Provisional application No. 60/042,588, Apr. 3, 1997.
[51] Int. Cl.$^6$ .................................................. C03C 10/16
[52] U.S. Cl. .................................. 501/3; 501/5; 501/10; 501/37; 501/900; 65/33.1; 65/33.3
[58] Field of Search .................................. 501/2, 3, 5, 10, 501/37, 900; 65/33.1, 33.3

[56] References Cited

U.S. PATENT DOCUMENTS

| | | |
|---|---|---|
| 4,437,192 | 3/1984 | Fujiu et al. . |
| 4,643,982 | 2/1987 | Kasuga et al. . |
| 4,746,632 | 5/1988 | Flannery et al. ............................. 501/3 |
| 4,783,429 | 11/1988 | Shibuya et al. . |
| 4,820,660 | 4/1989 | Mohri et al. . |
| 4,829,026 | 5/1989 | Takahashi et al. . |
| 4,994,414 | 2/1991 | Yamamoto et al. . |
| 5,034,353 | 7/1991 | Shibuya et al. . |
| 5,077,132 | 12/1991 | Maruno et al. . |
| 5,120,340 | 6/1992 | Ducheyne et al. . |
| 5,236,495 | 8/1993 | Manabe et al. ........................... 106/35 |
| 5,304,577 | 4/1994 | Nagata et al. . |
| 5,318,929 | 6/1994 | Jana et al. . |
| 5,336,642 | 8/1994 | Wolcott . |

FOREIGN PATENT DOCUMENTS

| | | |
|---|---|---|
| 4020893 A1 | 6/1989 | Denmark . |
| 0 264 917 | 4/1988 | European Pat. Off. . |
| 0 641 556 A1 | 3/1995 | European Pat. Off. . |

*Primary Examiner*—Karl Group
*Attorney, Agent, or Firm*—William Greener

[57] ABSTRACT

The present invention relates to a transparent glass-ceramic article which includes a glass matrix and a crystalline phase of apatite crystals in the glass matrix. The present invention further relates to a method of producing the transparent glass-ceramic article.

31 Claims, 5 Drawing Sheets

TRANSPARENT APATITE GLASS CERAMICS

This application claims benefit of Provisional Application Ser. No. 06/042,588, filed Apr. 3, 1997.

FIELD OF THE INVENTION

The present invention relates to a transparent glass-ceramic article and a method of making the article.

BACKGROUND OF THE INVENTION

Crystals of the apatite group are prevalent in nature. The mineral apatite itself, typically close in composition to $Ca_{10}(PO_4)_6F_2$, is widely disseminated as an accessory phase in all classes of rock, i.e. igneous, sedimentary, and metamorphic (C. S. Hurlbut, Jr., et al., *Manual of Mineralogy*, 19th ed., John Wiley and Sons, (1977)). The phosphate materials of teeth and bones are members of the apatite group. Despite obvious dissimilarity in composition, the ore minerals pyromorphite ($Pb_{10}(PO_4)_6Cl_2$), mimetite ($Pb_{10}(AsO_4)_6Cl_2$), and vanadinite ($Pb_{10}(VO_4)_6Cl_2$) are isostructural with apatite.

A wide range of synthetic crystals of the apatite group have been studied for their potential usefulness as low dielectric loss ceramic dielectrics and as luminescing materials (A. G. Cockbain et al., *Min. Map.* 36:411–21, (1968); W. L. Wanmaker et al., *Philips Res. Repts,* 26:373–81, (1971)). Strong, sintered glass-ceramics based on F-deficient fluorapatite and wollastonite ($CaSiO_3$) are biocompatible and are under extensive study for use as bone implants (T. Kokubo, et al., *J. Mater. Sci.* 21:535 (1986)). More recently, single crystals of $Sr_{10}(PO_4)_6F_2$ ("SFAP"), or Sr-fluorapatite, have been evaluated as Yb-doped solid state laser crystals (L. D. DeLoach et al., *J. Opt. Soc. Am. B,* 11:269–76 (1994)).

The prior art, however, does not produce a transparent material containing apatite crystals in glass. Production of apatite single crystals is quite difficult and expensive. Further, the prior art does not produce a transparent material containing apatite crystals, which provides desirable features, such as optical activity.

The present invention is directed toward overcoming these deficiencies.

SUMMARY OF THE INVENTION

The present invention relates to a transparent glass-ceramic article which includes a glass matrix and a crystalline phase of apatite crystals in the glass matrix.

Another aspect of the present invention relates to a method of making a transparent glass-ceramic article which includes providing a glass matrix and treating the glass matrix under conditions effective to produce the transparent glass-ceramic article which includes a glass matrix and a crystalline phase of apatite crystals in the glass matrix.

Transparent glasses containing relatively small numbers of apatite crystals are highly desirable in applications where there is a requirement for the glass to be easily melted or formed and additionally to contain a crystal, where the crystal itself may be difficult or expensive to synthesize. Such transparent glasses containing small numbers of apatite crystals are especially desirable where the crystal itself provides highly desirable features, such as optical activity.

BRIEF DESCRIPTION OF THE DRAWINGS

FIG. 1 illustrates the structure of a fluorapatite, $Ca_5(PO_4)_3F$. The structure is projected on the (0001) plane. The dashed parallelogram outlines the base of the unit cell. The tetrahedral ($PO_4$) groups, the triangular coordination of F to Ca, and examples of the two types of coordination about Ca are shown. The oxygen atoms of the $PO_4$ groups are linked to Ca, with ⅖ of the calcium ions surrounded by the six closest oxygens in the form of trigonal prisms, and ⅗ of the calcium ions surrounded by five oxygens and one F. Each F lies in a triangle with three calcium ions (C. S. Hurlbut, Jr., et al., *Manual of Mineralogy,* 19th ed., John Wiley and Sons, (1977), which is hereby incorporated by reference). The arrangement of a Ca-hydroxy apatite or a Ca-chlorapatite would be similar, with OH or Cl replacing F.

DETAILED DESCRIPTION OF THE INVENTION

The present invention relates to a transparent glass-ceramic article which includes a glass matrix and a crystalline phase of apatite crystals in the glass matrix.

Another aspect of the present invention relates to a method of making a transparent glass-ceramic article which includes providing a glass matrix and treating the glass matrix under conditions effective to produce the transparent glass-ceramic article which includes a glass matrix and a crystalline phase of apatite crystals in the glass matrix.

The present invention relates to transparent glass-ceramic articles which contain low levels of crystallinity, with the crystals having an apatite structure. The glass matrix acts simply as a vehicle for the apatite crystals and, therefore, can be any glass chosen for its physical or chemical properties, its ease of melting, or whatever specific features are required for a particular application. Examples of suitable glass matrices include alkali or alkaline earth aluminosilicate or aluminoborosilicate glasses. Particularly preferred glass matrices include mixed sodium and potassium aluminosilicate and alkaline earth (alkali-free) aluminosilicate glasses.

Figure 1:
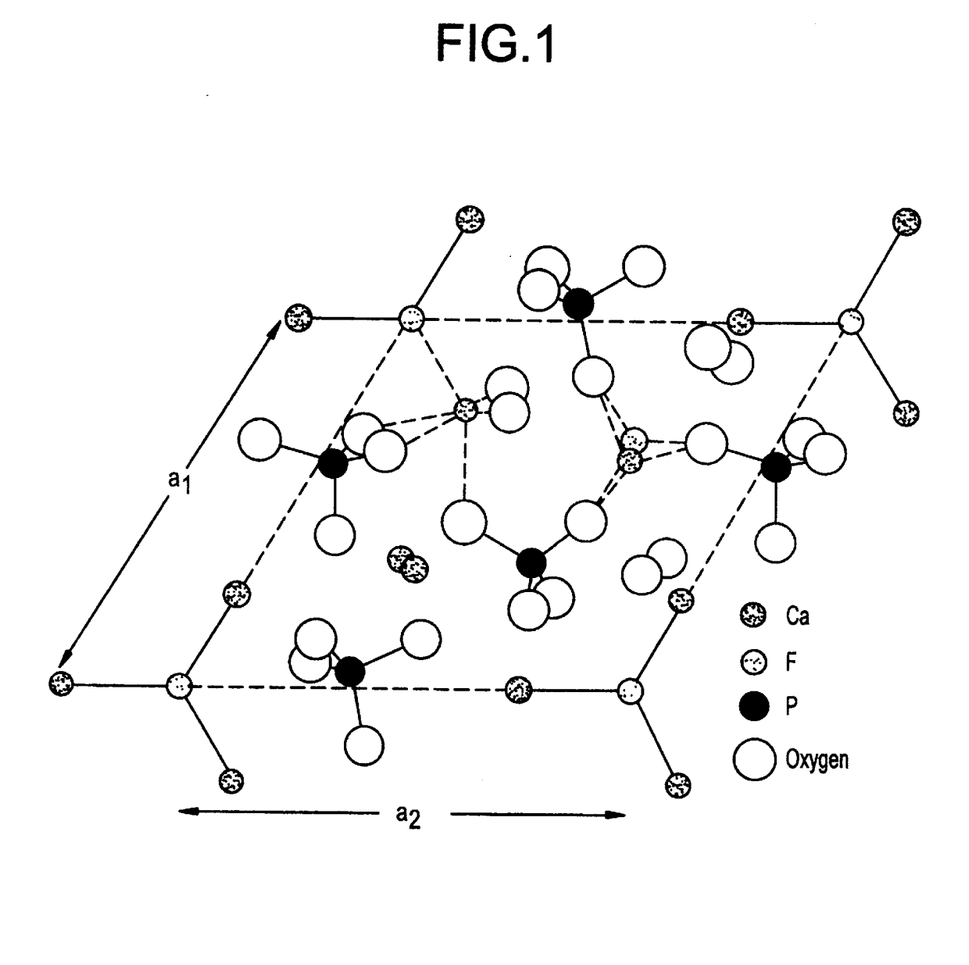

Preferably, the transparent glass-ceramic articles contain less than about 20% apatite crystals by volume of the glass-ceramic composition, with less than about 12% by volume being highly desirable, and from 3 to 8% by volume being preferred. Materials with such low crystallinity are not technically defined as glass-ceramics, but, rather, as glasses. However, they will be referred to here as glass-ceramics, because the advantages of the present invention are due to its crystalline content; the glass matrix simply acts as a vehicle for the crystal. The structure of apatite crystals is detailed in FIG. 1 and the accompanying discussion. The chemical formula for the apatite crystalline phase of the transparent glass-ceramic article is as follows:

where A is selected from the group consisting of Sr, Ca, Pb, Bi, Cd, Ba, rare earth elements, and alkali elements;

X is selected from the group consisting of P, Si, Ge, As, S, V, and transition elements; and Z is OH or a halide.

A desirable transparent glass-ceramic article has a crystalline phase of apatite crystals having the following formula:

$$A_{10}(XO_4)_6Z_2$$

where A is selected from the group consisting of Sr, Ca, Ba, and Na;

X is P or Si; and

Z is F or Cl.

One desirable composition for the transparent glass-ceramic article includes 30–60 wt. % $SiO_2$, 18–40 wt. % $Al_2O_3$, 10–30 wt. % $Na_2O$, 0–20 wt. % $K_2O$, 2–10 wt. % $P_2O_5$, 0–8 wt. % SrO, 0–5 wt. % $SrF_2$, 0–4 wt. % CaO, 0–2 wt. % $CaF_2$, 0–4 wt. % $CaCl_2$, 0–10 wt. % BaO, 0–6 wt. % $BaF_2$, 0–10 wt. % $B_2O_3$, and 0–20 wt. % oxides of rare earth ions. The rare earth elements are selected from the group consisting of Y, La, Ce, Pr, Nd, Pm, Sm, Eu, Gd, Tb, Dy, Ho, Er, Tm, Yb, and Lu.

A preferred composition includes 48–60 wt. % $SiO_2$, 18–28 wt. % $Al_2O_3$, 10–15 wt. % $Na_2O$, 0–20 wt. % $K_2O$, 2–8 wt. % $P_2O_5$, 0–7 wt. % SrO, 0–4 wt. % $SrF_2$, 0–4 wt. % CaO, 0–2 wt. % $CaF_2$, 0–4 wt. % $CaCl_2$, 0–10 wt. % BaO, 0–6 wt. % $BaF_2$, and 0–20 wt. % oxides of rare earth elements.

Another desirable transparent glass-ceramic article has a crystalline phase of apatite crystals having the following formula:

$$A_{10}(XO_4)_6Z_2,$$

where A is selected from the group consisting of Na and La;

X is Si; and

Z is F or Cl.

This desirable glass-ceramic article has a composition which includes 30–55 wt. % $SiO_2$, 20–40 wt. % $Al_2O_3$, 12–30 wt. % $Na_2O$, 2–10 wt. % F, and 5–20 wt. % $La_2O_3$.

Although the maximum apatite crystalline volume depends on the base glass chosen, it is generally desirable to provide less than about 10% $P_2O_5$ as a starting material in the glass in order to avoid phase separation or spontaneous crystallization (to the apatite phase) and to maintain transparency.

The rare earth elements may be contained entirely in the crystalline phase. Alternatively, the rare earth elements are contained both in the glass matrix and in the crystalline phase.

The transparent glass-ceramic article is produced by providing a glass matrix and treating the glass matrix under conditions effective to produce the transparent glass-ceramic article, which includes a glass matrix and a crystalline phase of apatite crystals in the glass matrix.

Optionally, the glass matrix is provided as a formed glass shape. Alternatively, the glass matrix is provided by producing the glass matrix. The glass matrix is produced by any traditional glass making procedures. For example, glass components which include alkoxides and are calculated to produce a glass matrix having the desired composition are used in a sol gel approach, such as disclosed in U.S. Pat. No. 5,494,863 to Mathur, which is hereby incorporated by reference, to produce the glass matrix. In addition, for example, the glass matrix may be produced using chemical vapor deposition techniques.

A particularly preferred way of providing the glass matrix is by producing the glass matrix through traditional melting and forming techniques. Preferably, the glass matrix is produced by first melting together batch components calculated to produce a glass matrix having the desired composition to give a glass melt. More preferably, the glass components are melted at from about 1300° C. to about 1600° C. for from about 4 to about 16 hours. Next, the glass melt is formed into a glass shape. Suitable forming procedures include rolling, pressing, casting, or fiber drawing. The glass shape is then preferably a patty, rod, sheet, or fiber.

Subsequently, the glass matrix provided is treated under conditions effective to produce a transparent glass-ceramic article having a glass matrix and a crystalline phase of apatite crystals in the glass matrix.

In one embodiment, the glass matrix, upon treating may spontaneously crystallize to produce a transparent glass-ceramic article which includes a crystalline phase of apatite crystals in a glass matrix. Preferably, the treating step is achieved by annealing. Typically, the annealing step includes holding the glass shape at a temperature of from about 450° C. to about 750° C. for from about 0.5 to about 2 hours, followed by cooling. Typically, cooling takes place to room temperature overnight. In compositions which are designed to spontaneously crystallize, the annealing step produces the transparent glass-ceramic article which includes the crystalline phase of apatite crystals in the glass matrix.

In another embodiment, the glass matrix is subjected to a separate heating step after annealing. The heating step is designed to promote phase separation and crystallization of the apatite phase, producing a glass-ceramic article which includes a crystalline phase of apatite in a glass matrix. Such a heating step is desirable where additional crystal formation is required or where spontaneous phase separation and crystallization does not occur in the annealing step.

Preferably, the annealed glass matrix is heated in a heating step at a temperature from about 600° C. to about 950° C. It is preferable for the heating step to include heating the annealed glass matrix at a temperature from about 600° C. to about 850° C. for up to about 1 hour, followed by heating the annealed glass matrix at a temperature from about 700° C. to about 950° C. for up to about 2 hours. The glass matrix is then cooled. Typically, cooling takes place to room temperature overnight.

The transparent glass-ceramic article is especially useful where a glass matrix which is easily melted or easily formed is desired or where the glass matrix contains a crystalline phase which may be difficult or expensive to produce.

Figure 3:
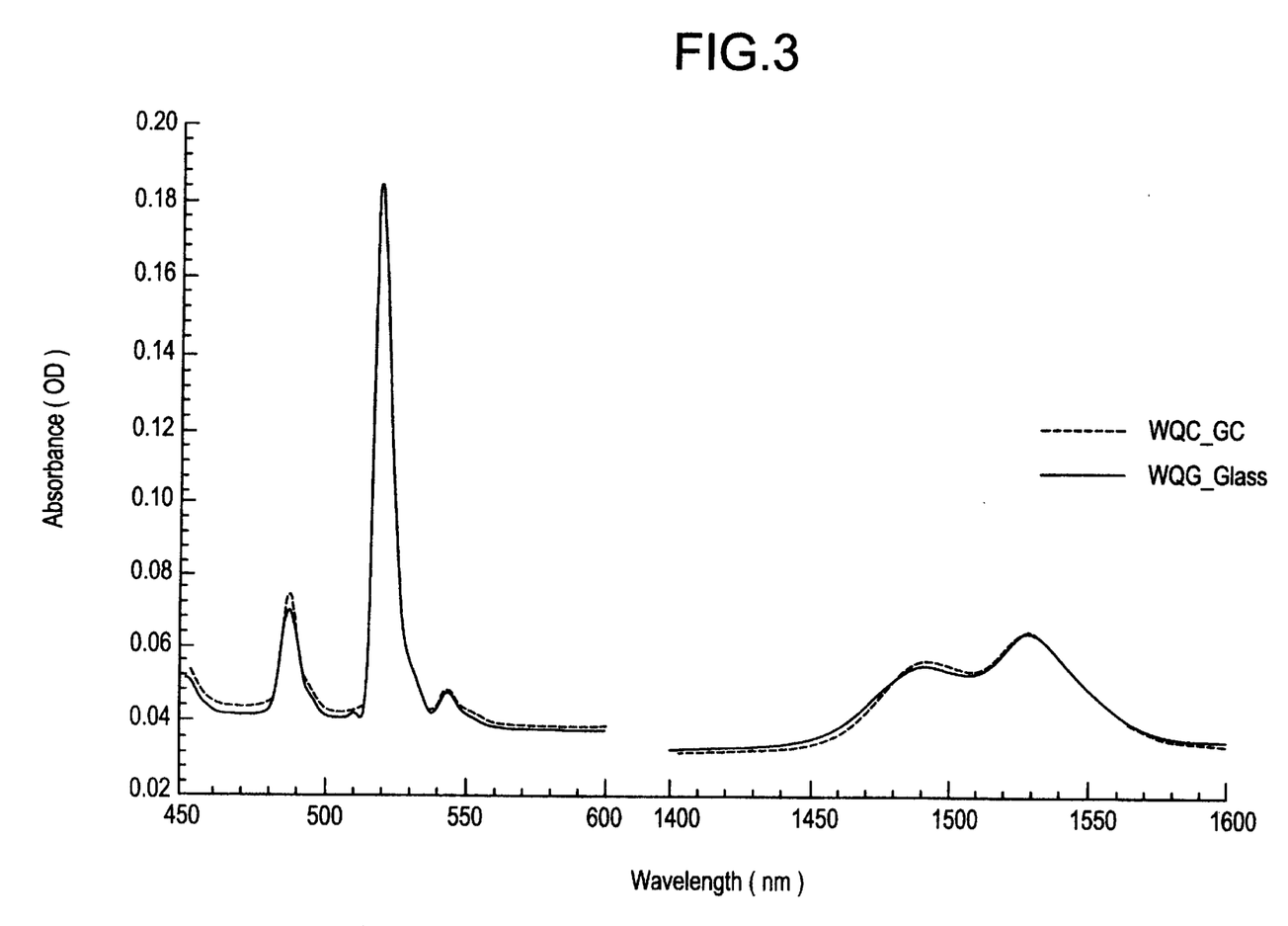
FIG. 3 illustrates the absorbance of a sample of WQG glass and a sample of WQG glass-ceramic produced in Example 1.
Figure 4:
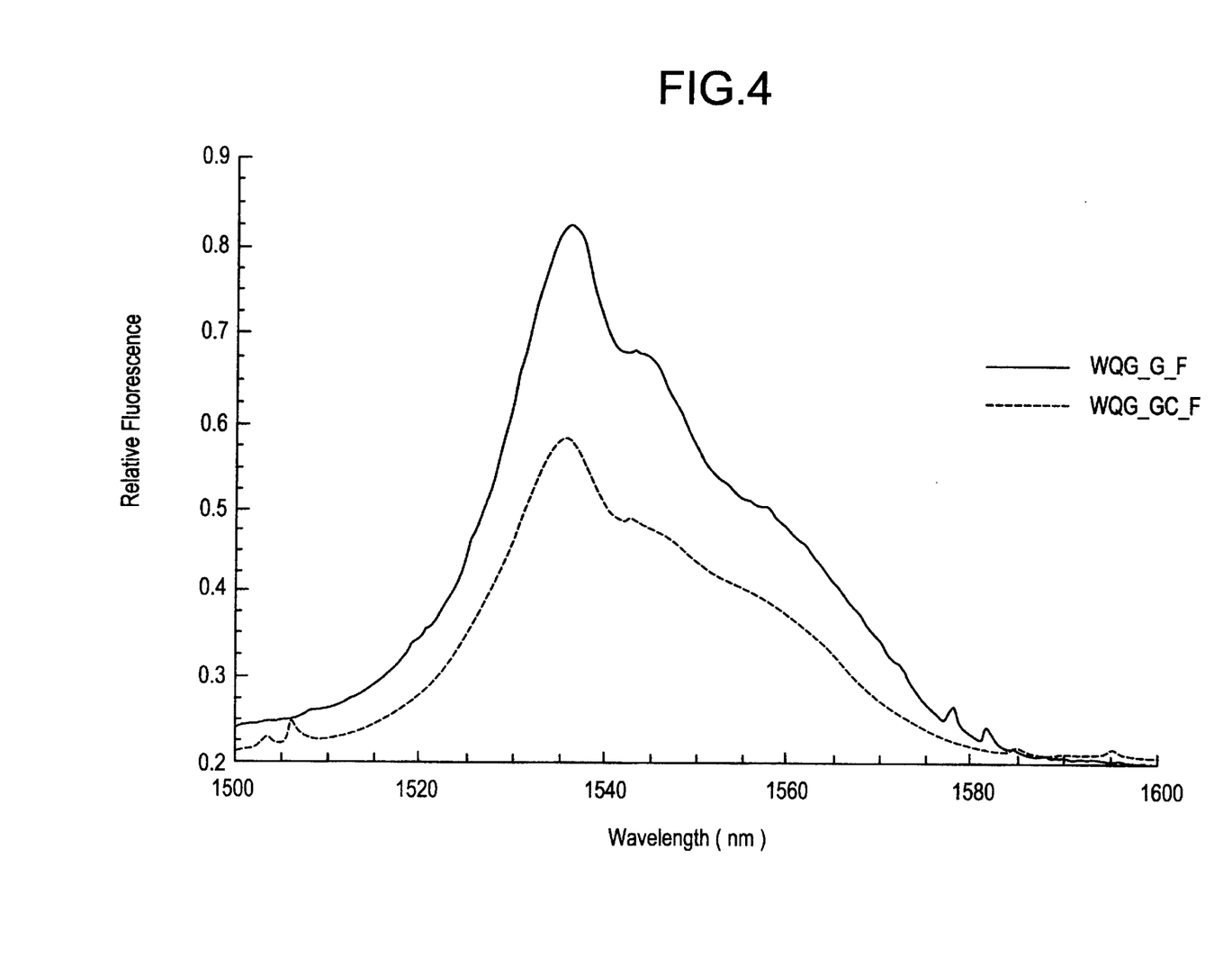
FIG. 4 illustrates the relative fluorescence of a sample of 908WQG glass and a sample of 908WQG glass-ceramic produced in Example 1.

Further, a transparent glass-ceramic article which includes apatite crystals in the glass matrix is especially useful where the crystals act as selective hosts for rare earth ions. Rare earth elements have ionic radii very similar to that of $Ca^{2+}$ (~1.0 Å for six-coordinated Ca) and commonly substitute for calcium in minerals. Indeed, there are rare earth end member apatite compounds (A. G. Cockbain, *Min. Mag.* 36:654–60 (1968), which is hereby incorporated by reference). The emission spectra of Er- and Yb-doped Sr- and Sr,Ca-apatite glasses indicate both significant partitioning of the rare earth element into the crystal phase as well as, in the case of Er-doping, flat emission from 1540 to 1570 nm. Upon ceramming, the hypersensitive $Er^{3+}\,^4I_{15/2}\text{-->}^2H_{11/2}$ absorption at 520 nm decreases in intensity and the $^4I_{15/2}\text{-->}^4I_{13/2}$ side band absorption at 1490 nm increases in intensity, as shown in FIG. 3. These results indicate significant change in the environment around the $Er^{3+}$ ion, indicating at least partial partitioning of the $Er^{3+}$ into the crystal. FIG. 4 shows the effect of ceramming on the $^4I_{13/2}\text{-->}^4I_{15/2}$ fluorescence. The 1530 nm peak is diminished and the long wavelength shoulder is significantly flattened, again confirming partitioning of the $Er^{3-}$ into the crystal.

It is not necessary to have complete partitioning of the rare earth element into the crystalline phase. For certain applications, such as gain-flattened amplifiers, for example, a combination of $Er^{3+}$ in the glass matrix and in the crystalline phase is optimal. This permits tailoring of the site sizes and geometries of the apatite crystals to optimize the local environments of any dopant lanthanide ions.

The apatite crystals in the crystalline phase are generally oriented randomly throughout the bulk of the glass matrix, unlike the orientation provided by a single crystal. Random orientation is especially advantageous for polarization-insensitive applications such as amplifiers, lasers, and sensors. The transparent glass-ceramic article of the present invention is especially useful as an amplifier, where polarization-independent gain is imperative.

EXAMPLES

Example 1

Various transparent glass-ceramic articles were produced as follows. Glass forming batch materials calculated to produce the desired compositions were mixed, and the mixture was melted in covered platinum or silica crucibles for 16 hours at 1575° C. to produce a glass melt. The glass melt then was cast as 4"×8"×0.25" thick patties and annealed at 700° C. to produce transparent glasses.

Small (approximately 1"×1") coupons of each glass were placed into a furnace and heat treated using the following schedule:

300° C./hr to 775° C., Hold at 775° C. for 1 hour.
300° C./hr to 850° C., Hold at 850° C. for 2 hours.
Cool at furnace rate.

Figure 2A:
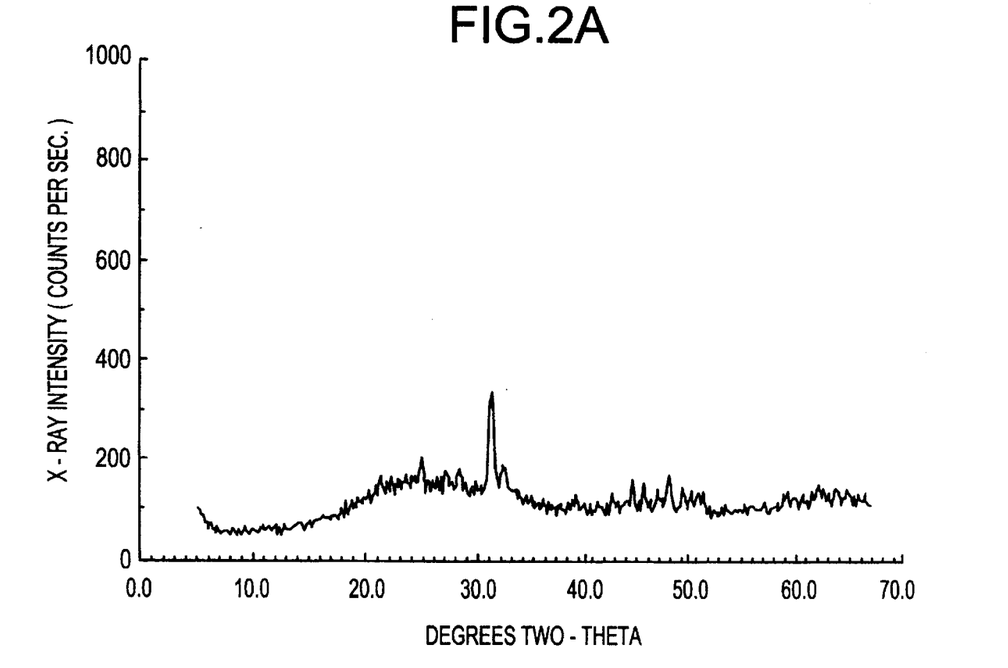
FIGS. 2A, 2B, and 2C illustrate the X-ray powder diffraction traces of 908WQJ, a $(Sr, Ca)(PO_4)$-fluorapatite, 908WRJ, a $Ba(PO_4)$-fluorapatite, and 870VU, a $(Na, La)–(SiO_4)$ fluorapatite, respectively, as produced in Example 1.
Figure 2B:
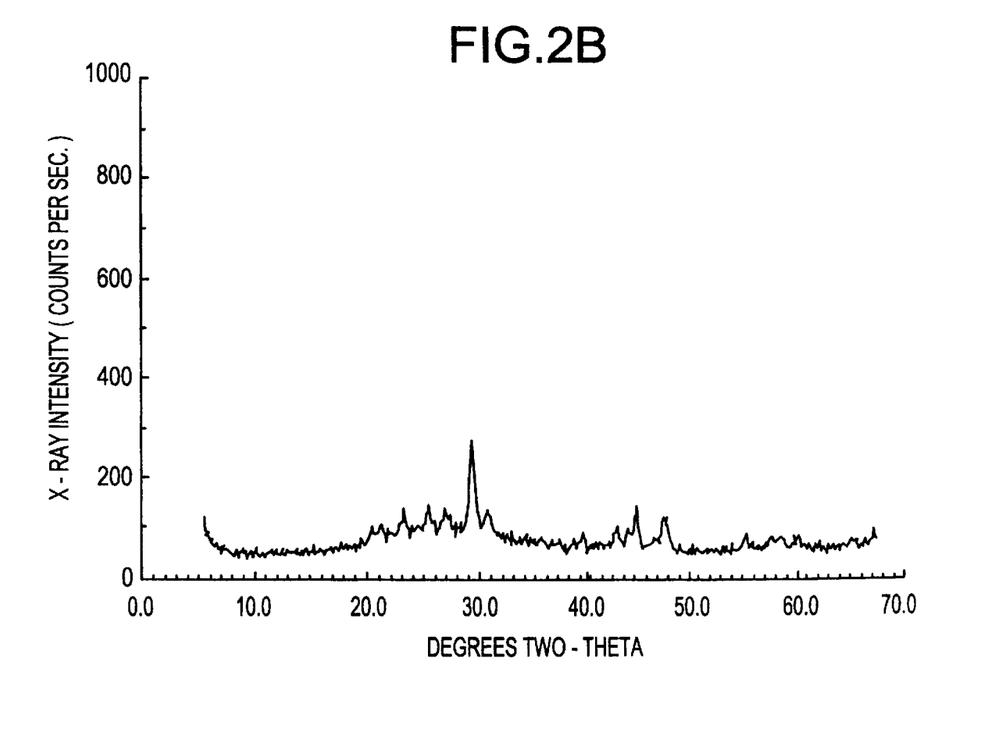
Figure 2C:
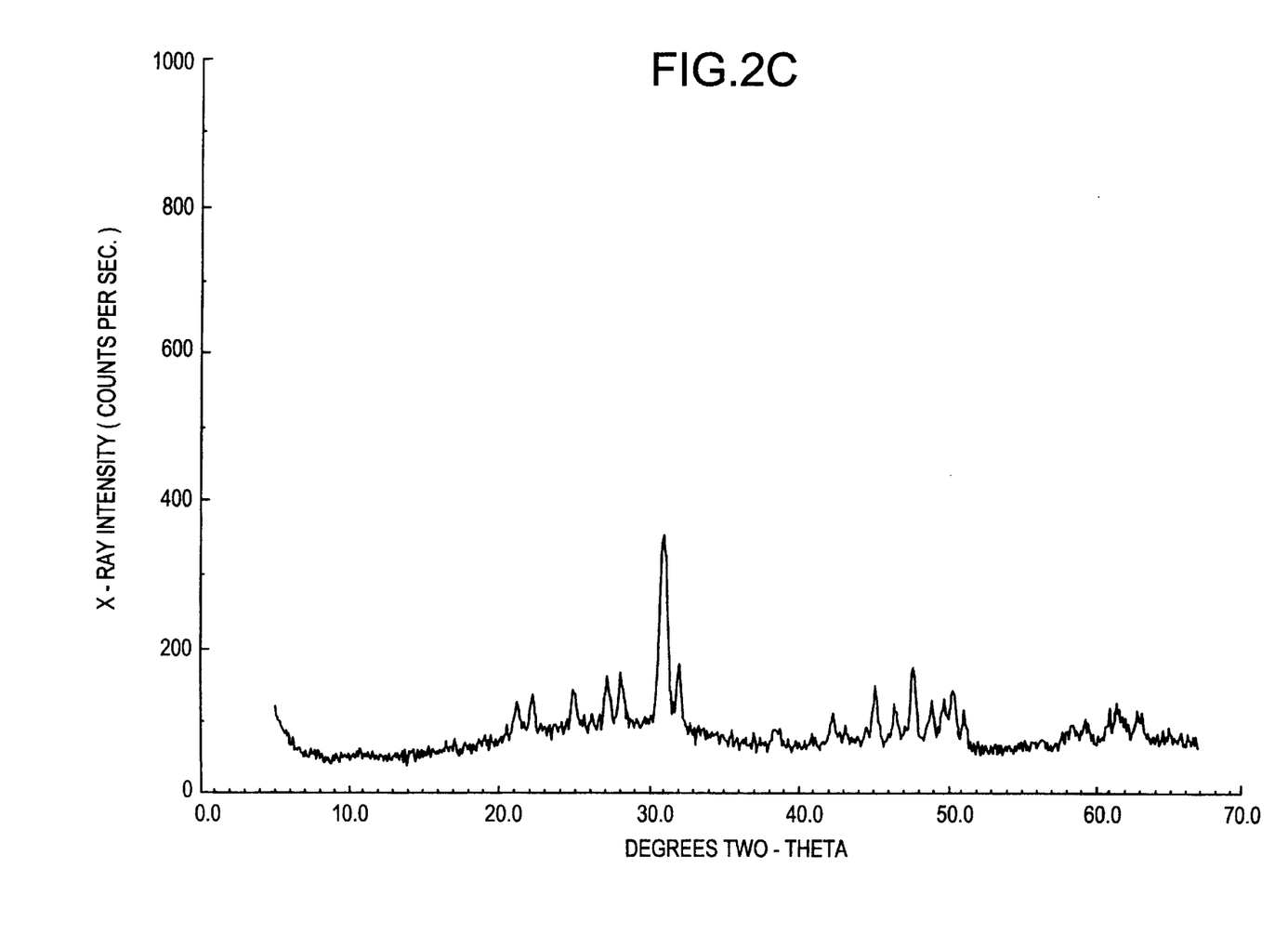

After visual examination of the sample, the crystalline phases were identified using X-ray powder diffraction. In all cases, the only phase present was apatite, with the d-spacings varying according to the mean size of the ions in the apatite crystals. Examples of representative glass-ceramic compositions obtained are listed in Tables 1–3 below. The examples shown in Table 2 below illustrate the use of different base glasses (sodium aluminosilicate and barium aluminosilicate) as well as different apatite compositions: A=Ca,Sr,Ba,Pb; Z=F,Cl. Tables 1 and 3 below gives the compositions of some lanthanide-doped apatite glass-ceramics. Representative diffraction patterns for samples 908WQJ, 908WRJ, and 870VU (as shown in Tables 1 and 2 below) are shown in FIGS. 2A, 2B, and 2C.

TABLE 1

Composition of Apatite Glass-Ceramics

|  | 908WQG | 908WQH | 908WQ1 | 908WQJ | 908WQK | 908WQL | 908WQS | 908WQU |
|---|---|---|---|---|---|---|---|---|
| $SiO_2$ | 53.5 | 53.5 | 52.8 | 53.8 | 53.8 | 53.3 | 52.0 | 50.4 |
| $Al_2O_3$ | 22.0 | 22.0 | 22.0 | 22.0 | 22.0 | 22.0 | 22.0 | 22.0 |
| $Na_2O$ | 13.0 | 13.0 | 13.0 | 13.0 | 13.0 | 13.0 | 13.0 | 13.0 |
| $K_2O$ | 1.0 | 1.0 | 1.0 | 1.0 | 1.0 | 1.0 | 1.0 | 1.0 |
| $P_2O_5$ | 4.5 | 4.5 | 4.5 | 4.5 | 4.5 | 4.5 | 5.0 | 5.0 |
| SrO | 4.0 | 4.0 | 3.2 | 3.0 | 3.0 | 2.2 | 5.0 | 3.8 |
| $SrF_2$ | 1.0 | 1.0 | 1.0 | 0.7 | 0.7 | 0.7 | 1.0 | 2.7 |
| CaO | — | — | — | 0.7 | 0.7 | 0.5 | — | — |
| $CaF_2$ | — | — | — | 0.25 | 0.25 | 0.25 | — | — |
| $Er_2O_3$ | 1.0 | — | — | 1.0 | — | — | 1.0 | 1.0 |
| $Yb_2O_3$ | — | 1.0 | 2.5 | — | 1.0 | 2.5 | — | — |

|  | 908WQV | 908WQW | 908WQY | 908WQZ | 908WRA | 908WYJ | 870VU |
|---|---|---|---|---|---|---|---|
| $SiO_3$ | 50.4 | 50.0 | 52.0 | 50.5 | 52.5 | 55.4 | 42.4 |
| $Al_2O_3$ | 22.0 | 21.0 | 21.0 | 21.0 | 21.0 | 22.5 | 28.7 |
| $Na_2O$ | 12.5 | 12.0 | 12.0 | 12.0 | 12.0 | 13.0 | 17.5 |
| $K_2O$ | 1.0 | 1.0 | 1.0 | 1.0 | 1.0 | 1.0 | — |
| $P_2O_5$ | 5.0 | 5.0 | 6.0 | 6.0 | 6.0 | 4.5 | — |
| SrO | 4.6 | 7.0 | 5.2 | 5.0 | 5.0 | — | — |
| $SrF_2$ | 1.5 | 1.0 | 1.8 | 1.5 | 1.5 | — | — |
| CaO | — | — | — | — | — | 2.2 | — |
| $CaF_2$ | — | — | — | — | — | 0.4 | — |
| $Er_2O_3$ | 3.0 | 1.0 | 1.0 | 3.0 | — | 1.0 | — |
| $Yb_2O_3$ | — | — | — | — | 1.0 | — | — |
| NaCl | — | — | — | — | — | 1.5 | — |
| $La_2O_3$ | — | — | — | — | — | — | 8.27 |
| $Eu_2O_3$ | — | — | — | — | — | — | 0.223 |
| F | — | — | — | — | — | — | 2.4 |

TABLE 2

Composition of Glass-Ceramics

|  | 908WRE | 908WRF | 908WRG | 908WRI | 908WRJ | 908WRK | 908WRL | 870VU |
|---|---|---|---|---|---|---|---|---|
| $SiO_2$ | 47.0 | 53.8 | 53.0 | 53.0 | 52.0 | 45.5 | 45.0 | 42.4 |
| $Al_2O_3$ | 6.0 | 22.0 | 21.5 | 22.0 | 21.0 | 6.0 | 6.0 | 28.7 |
| $Na_2O$ | — | 13.0 | 12.5 | 13.0 | 12.0 | — | — | 17.5 |
| $K_2O$ | — | 1.0 | 1.0 | 1.0 | 1.0 | — | — | — |
| $P_2O_5$ | 5.0 | 5.0 | 5.0 | 5.0 | 5.0 | 5.0 | 5.0 | — |
| SrO | 3.4 | 3.4 | 4.0 | 4.5 | — | 4.5 | — | — |

TABLE 2-continued

Composition of Glass-Ceramics

|  | 908WRE | 908WRF | 908WRG | 908WRI | 908WRJ | 908WRK | 908WRL | 870VU |
|---|---|---|---|---|---|---|---|---|
| $SrF_2$ | 0.7 | 0.7 | 1.0 | 1.0 | — | 1.0 | — | — |
| CaO | 0.7 | 0.6 | — | — | — | — | 2.0 | — |
| $CaF_2$ | 0.25 | — | — | — | — | — | 0.8 | — |
| $CaCl_2$ | — | 0.7 | — | — | — | — | — | — |
| BaO | 37.0 | — | — | 1.0 | 7.0 | 37.0 | 42.0 | — |
| $BaF_2$ | — | — | — | 1.0 | 2.0 | 1.0 | 2.0 | — |
| PbO | — | — | 2.0 | — | — | — | — | — |
| $La_2O_3$ | — | — | — | — | — | — | — | 8.27 |
| $Eu_2O_3$ | — | — | — | — | — | — | — | 0.223 |
| F | — | — | — | — | — | — | — | 2.4 |
| Host Glass | BAS | NAS | NAS | NAS | NAS | BAS | BAS | NAS |
| $d_{(112)}$ spacing Å | 3.03 | 2.92 | 2.93 | 2.95 | 3.08 | 3.03 | 3.08 | 2.90 | where "BAS" is barium aluminosilicate glass and "NAS" is sodium aluminosilicate glass. The inferred compositions of the apatite phase of the glass-ceramic articles are consistent with the d-spacing of the major apatite peak obtained on X-ray diffraction patterns. The inferred compositions of the glass-ceramic articles shown in Table 2 above are as follows:

WRE $(Ba,Sr,Ca)_{10}(PO_4)_6F_2$

WRF $(Sr,Ca)_{10}(PO_4)_6(F,Cl)_2$

WRG $(Sr,Pb)_{10}(PO_4)_6F_2$

WRI $(Sr,Ba)_{10}(PO_4)_6F_2$

WRJ $(Ba)_{10}(PO_4)_6F_2$

WRK $(Ba,Sr)_{10}(PO_4)_6F_2$

WRL $(Ba)_{10}(PO_4)_6F_2$

VU $(Na_2La_8)(SiO_4)_6F_2$ at 0.5 nm intervals. Results are shown in FIGS. 3 and 4. $Yb^{3+}$ fluorescence was measured in the same fashion using a 980 nm pump.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A transparent glass-ceramic article comprising:
   a glass matrix and a crystalline phase in the glass matrix, wherein the crystalline phase has the following formula:

$A_{10}(XO_4)_6Z_2$

TABLE 3

Er- and Yb-Doping of (Sr,Ca)-F-Apatite Glass-Ceramics

|  | 908WRN | 908WRO | 908WRP | 908WRR | 908WRS | 908WRT | 908WRU | 908WRV | 908WYC | 908WYJ |
|---|---|---|---|---|---|---|---|---|---|---|
| $SiO_2$ | 53.8 | 53.3 | 53.1 | 52.7 | 52.7 | 53.8 | 53.3 | 53.1 | 52.8 | 55.4 |
| $Al_2O_3$ | 22.0 | 22.0 | 22.0 | 22.0 | 22.0 | 22.0 | 22.0 | 22.0 | 22.5 | 22.5 |
| $Na_2O$ | 13.0 | 13.0 | 13.0 | 13.0 | 13.0 | 13.0 | 13.0 | 13.0 | 13.0 | 13.0 |
| $K_2O$ | 1.0 | 1.0 | 1.0 | 1.0 | 1.0 | 1.0 | 1.0 | 1.0 | 1.0 | 1.0 |
| $P_2O_5$ | 4.5 | 4.5 | 4.5 | 4.5 | 4.5 | 4.5 | 4.5 | 4.5 | 4.5 | 4.5 |
| SrO | 3.0 | 3.5 | 4.0 | 4.5 | 4.5 | 3.0 | 3.5 | 4.0 | 4.2 | — |
| $SrF_2$ | 0.7 | 0.9 | 1.0 | 1.0 | 1.0 | 0.7 | 0.9 | 1.0 | 1.0 | — |
| CaO | 0.7 | 0.6 | 0.3 | 0.1 | 0.1 | 0.7 | 0.6 | 0.3 | — | 2.2 |
| $CaF_2$ | 0.25 | 0.20 | 0.15 | 0.20 | 0.20 | 0.25 | 0.20 | 0.15 | — | 0.4 |
| $Er_2O_3$ | 1.0 | 1.0 | 1.0 | 1.0 | — | — | — | — | — | 1.0 |
| NaCl | — | — | — | — | — | — | — | — | — | 1.5 |
| $Yb_2O_3$ | — | — | — | — | 1.0 | 1.0 | 1.0 | 1.0 | 1.0 | — |
| Approximate proportion of Sr: to Ca: end members | 70:30 | 75:25 | 85:15 | 90:10 | 90:10 | 70:30 | 75:25 | 85:15 | 100:0 | 0:100 |
| $d_{(112)}$ spacing (Å) | 2.89 | 2.92 | 2.91 | 2.92 | 2.92 | 2.90 | 2.90 | 2.9 | 2.93 | 2.81 |

The inferred compositions of the apatite phase of the glass ceramic articles shown in Table 3 above were (Sr, Ca, Ln)$_{10}$(PO$_4$)$_6$F$_2$, where Ln is the lanthanide ion Er or Yb.

Example 2

Absorption and fluorescence spectra were measured for selected lanthanide-doped glasses and glass-ceramics produced in accordance with Example 1. Absorption spectra were made through 2 mm thick samples at 1 nm intervals. Fluorescence spectra were produced by pumping the sample at 520 nm to excite the $Er^{3+}$ ion to the $^2H_{11/2}$ level and the fluorescence was then measured with a cooled Ge detector where A is selected from the group consisting of Sr, Ca, Pb, Bi, Cd, Ba, rare earth elements, and alkali ions;

X is selected from the group consisting of P, Si, Ge, As, S, V, and transition elements; and Z is OH or a halide.

2. The transparent glass-ceramic article according to claim 1, wherein the crystalline phase comprises less than about 20% by volume of the glass-ceramic article.

3. The transparent glass-ceramic article according to claim 1, wherein the crystalline phase has the following formula:

$A_{10}(XO_4)_6Z_2$ where A is selected from the group consisting of Sr, Ca, Ba, La, and Na;

X is P or Si; and

Z is F or Cl.

4. The transparent glass-ceramic article according to claim 1, wherein the transparent glass-ceramic article comprises 30–60 wt. % SiO$_2$, 18–40 wt. % Al$_2$O$_3$, 10–30 wt. % Na$_2$O, 0–20 wt. % K$_2$O, 2–10 wt. % P$_2$O$_5$, 0–8 wt. % SrO, 0–6 wt. % SrF$_2$, 0–4 wt. % CaO, 0–2 wt. % CaF$_2$, 0–4 wt. % CaCl$_2$, 0–10 wt. % BaO, 0–6 wt. % BaF$_2$, 0–10 wt. % B$_2$O$_3$, and 0–20 wt. % oxides of rare earth elements.

5. The transparent glass-ceramic article according to claim 4, wherein the rare earth elements are selected from the group consisting of Y, La, Ce, Pr, Nd, Pm, Sm, Eu, Gd, Tb, Dy, Ho, Er, Tm, Yb, and Lu.

6. The transparent glass-ceramic article according to claim 5, wherein the rare earth elements are contained entirely in the crystalline phase.

7. The transparent glass-ceramic article according to claim 5, wherein the rare earth elements are contained in the glass matrix and in the crystalline phase.

8. The transparent glass-ceramic article according to claim 4, wherein the glass matrix is an aluminosilicate or aluminoborosilicate glass.

9. The transparent glass-ceramic article according to claim 8, wherein the aluminosilicate glass is a mixed alkali aluminosilicate glass or an alkali-free alkaline earth aluminosilicate glass.

10. A method of making a transparent glass-ceramic article comprising:

providing a glass matrix and treating the glass matrix under conditions effective to produce the transparent glass-ceramic article comprising a glass matrix and a crystalline phase in the glass matrix, wherein the crystalline phase has the following formula:

$A_{10}(XO_4)_6Z_2$ where A is selected from the group consisting of Sr, Ca, Pb, Bi, Cd, Ba, rare earth elements, and alkali ions;

X is selected from the group consisting of P, Si, Ge, As, S, V, and transition elements; and Z is OH or a halide.

11. The method of claim 10, wherein the crystalline phase comprises less than about 20% by volume of the glass-ceramic article.

12. The method according to claim 10, wherein the crystalline phase has the following formula:

$A_{10}(XO_4)_6Z_2$ where A is selected from the group consisting of Sr, Ca, Ba, La, and Na;

X is P or Si,

Z is F or Cl.

13. The method according to claim 10, wherein the transparent glass-ceramic article comprises 30–60 wt. % SiO$_2$, 18–40 wt. % Al$_2$O$_3$, 10–30 wt. % Na$_2$O, 0–20 wt. % K$_2$O, 2–10 wt. % P$_2$O$_5$, 0–8 wt. % SrO, 0–5 wt. % SrF$_2$, 0–4 wt. % CaO, 0–2 wt. % CaF$_2$, 0–4 wt. % CaCl$_2$, 0–10 wt. % BaO, 0–6 wt. % BaF$_2$, 0–10 wt. % B$_2$O$_3$, and 0–20 wt. % oxides of rare earth elements.

14. The method according to claim 13, wherein the rare earth elements are selected from the group consisting of Y, La, Ce, Pr, Nd, Pm, Sm, Eu, Gd, Tb, Dy, Ho, Er, Tm, Yb, and Lu.

15. The method according to claim 14, wherein the rare earth elements are contained entirely in the crystalline phase.

16. The method according to claim 14, wherein the rare earth elements are contained in the crystalline phase and in the glass matrix.

17. The method according to claim 13, wherein the glass matrix is an aluminosilicate or aluminoborosilicate glass.

18. The method according to claim 10, wherein the providing comprises producing the glass matrix.

19. The method according to claim 18, wherein the providing comprises producing the glass matrix using a sol-gel procedure.

20. The method according to claim 18, wherein the providing comprises producing the glass matrix using a chemical vapor deposition procedure.

21. The method according to claim 18, wherein the providing comprises:

melting the glass matrix to produce a glass melt and forming the glass melt into a glass shape.

22. The method according to claim 21, wherein the melting is performed at from about 1300° C. to about 1600° C. for about 4 to 16 hours.

23. The method according to claim 10, wherein the treating comprises annealing the glass matrix to form the transparent glass-ceramic article comprising a crystalline phase of apatite crystals in the glass matrix.

24. The method according to claim 23, wherein the annealing comprises:

holding the glass matrix at a temperature of from about 450° C. to about 750° C. for 0.5 to 2 hours and cooling the glass matrix after the holding.

25. The method according the claim 10, wherein the treating comprises:

annealing the glass matrix to form an annealed glass matrix and heating the annealed glass matrix at a temperature of from about 600° C. to about 950° C.

26. The method according to claim 25, wherein the annealing comprises:

holding the glass matrix at a temperature of from about 450° C. to about 750° C. for 0.5 to 2 hours and cooling the glass matrix after the holding.

27. The method according to claim 26, wherein the heating comprises:

heating the annealed glass matrix at a temperature from about 600° C. to about 850° C. for up to about 1 hour;

heating the annealed glass matrix at a temperature from about 700° C. to about 950° C. for up to about 2 hours; and cooling the annealed glass matrix.

28. A product prepared by the method according to claim 10.

29. A product prepared by the method according to claim 21.

30. A product prepared by the method according to claim 23.

31. A product prepared by the method according to claim 27.

* * * * *